United States Patent [19]
Toda et al.

[11] 3,873,657
[45] Mar. 25, 1975

[54] METHOD FOR PRODUCING HIGHLY PURE SINTERED POLYCRYSTALLINE YTTRIUM OXIDE BODY HAVING HIGH TRANSPARENCY

[75] Inventors: Gyozo Toda, Hino; Iwao Matsuyama, Hachioji; Yasuo Tsukuda, Ohme, all of Japan

[73] Assignee: Hitachi, Ltd., Tokyo, Japan

[22] Filed: Aug. 27, 1973

[21] Appl. No.: 391,839

[30] Foreign Application Priority Data
Aug. 25, 1972 Japan.................................. 47-84546

[52] U.S. Cl........................... 264/56, 264/1, 264/65, 264/66, 264/82, 264/DIG. 25, 106/55, 106/65
[51] Int. Cl..................... C04b 35/00, C04b 35/64, C04b 35/50, B29d 11/00
[58] Field of Search ............ 106/39.5, 55, 47 Q, 65, 106/313; 264/1, 56, 63, 65, 66, 82, 85, 101

[56] References Cited
UNITED STATES PATENTS
2,805,166  9/1957  Löffler................................. 106/47
3,764,643  10/1973  Muta et al. ......................... 264/66

Primary Examiner—Donald J. Arnold
Assistant Examiner—John Parrish
Attorney, Agent, or Firm—Craig & Antonelli

[57] ABSTRACT

When highly pure yttrium oxide is press molded into a desired shape and then the press molded body thus obtained is sintered at an elevated temperature in the presence of a beryllium compound, a sintered polycrystalline yttrium oxide body excellent in transparency is easily obtained at a comparatively low molding pressure and at a comparatively low sintering temperature.

24 Claims, 6 Drawing Figures

METHOD FOR PRODUCING HIGHLY PURE SINTERED POLYCRYSTALLINE YTTRIUM OXIDE BODY HAVING HIGH TRANSPARENCY

BACKGROUND OF THE INVENTION

This invention relates to a method for producing a sintered polycrystalline yttrium oxide body having a very excellent transparency.

Yttrium oxide has a high melting point (2410°C.) and has good heat resistance and oxidation resistance. Further, it is excellent in chemical resistance and corrosion resistance and exhibits excellent optical characteristics by dint of the cubic crystal structure. Accordingly, yttrium oxide is effectively used as heat resistant material, optical materials for high temperature applications, electronic material and in envelopes of high pressure metal vapor discharge lamps.

Techniques of obtaining a sintered polycrystalline yttrium oxide body having a high density and a relatively high transparency by press molding fine powder of yttrium oxide of a high purity optionally incorporated with small amounts of additives and sintering it at a high temperature or by sintering such powder under a high pressure at a high temperature have recently been developed. For instance, the following methods can be mentioned:

1. Fine powder of substantially pure yttrium oxide (having a purity of 99.9 to 99.99%) is cold molded, and the resulting molded body is charged in a graphite mold. A tungsten spacer is inserted between the yttrium oxide body and the graphite mold so that they are prevented from contacting each other and reacting with each other. Then, the assembly is set in a hot pressing machine. Evacuation is effected until the pressure is reduced to $10^{-5}$ Torr and the temperature is elevated at a rate of 5 to 6°C. per minute. Then, the temperature is maintained at 300 to 600°C. for about 1 hour following which the pressure is elevated to 350 to 490 kg/cm$^2$ and the temperature is elevated to 1300 to 1500°C. At this temperature the assembly is maintained for 1 to 2 hours to accomplish the hot pressing. After completion of hot pressing, the hot pressed body is gradually cooled so that cracks are not formed in the body by thermal shock. Since carbon derived from the graphite mold is left in the resulting sintered body, in order to remove this residual carbon, the sintered body is treated at 1000°C. for about 1 hour in an oxygen atmosphere. Thus is obtained a sintered polycrystalline transparent yttrium oxide body.

2. Fine powder of substantially pure yttrium oxide is cold molded, and a molded body is heated under pressure in the state inserted between two sheets of a hard material to obtain a sintered polycrystalline transparent yttrium oxide body. In this case, since no mold is used for molding, the sintered body is deformed in the lateral direction vertical to the pressing direction.

3. Powder of substantially pure yttrium oxide having a particle size of about 3 $\mu$ is incorporated with 3 to 5% by weight of powder of lithium fluoride (LiF) having a size not exceeding 325 mesh, and the powders are wet mixed in the presence of acetone in a ball mill. The resulting mixture is dried in vacuo at 60°C. for 12 to 24 hours and then cold molded under a pressure of about 210 kg/cm$^2$. The molded body is put into a mold of mullite and zirconia powder is packed into a void formed between the molded body and mullite mold so that reaction is not caused to occur therebetween. Then, the assembly is set in an electric furnace and evacuation is effected to reduce the pressure to about 0.05 Torr. Then, the pressure is elevated to about 35 kg/cm$^2$ and then the temperature is elevated to 540°C., following which a pressure of about 85 kg/cm$^2$ is applied. Then, the temperature is elevated to 850 to 900°C. and the pressure is elevated to about 140 kg/cm$^2$. The temperature is further elevated to 950°C. and the pressure is elevated at a rate of about 35 kg/cm$^2$ per minute until the pressure reaches 700 to 850 kg/cm$^2$. Under this elevated pressure the assembly is maintained for 48 hours to accomplish the sintering. After completion of the sintering, the temperature is lowered to room temperature over a period of 6 hours. Thus is obtained a sintered polycrystalline transparent yttrium oxide body.

4. Fine powder of yttrium oxide having such a high purity as 99.99% is press molded under a molding pressure of 1 to 30 tons per square centimeter, and the molded body is heated and sintered at 1950 to 2400°C. for more than 10 minutes in a hydrogen or oxygen atmosphere or in vacuo. Thus is obtained a sintered transparent yttrium oxide body having a high density. In this method, if the press molding is conducted under a molding pressure of 7 to 25 tons per square centimeter, the evacuation treatment should be conducted at a temperature above 100°C. under a reduced pressure below $10^{-2}$ Torr. In order to impart a high transmimssion in a visible region to the sintered body, it is necessary to reduce the temperature to 1900 to 2000°C. after sintering at 1950 to 2400°C. and simultaneously replace the atmosphere gas by wet hydrogen having a dew point of 0°C. to room temperature and maintain the sintered body at said temperature for a short time.

According to these methods, it is possible to obtain a sintered polycrystalline yttrium oxide body having a considerably high transparency. Among a result of our research, it has been confirmed that among the foregoing conventional methods, better results are obtainable according to methods (1), (3) and (4) and that if optimum preparation conditions are chosen in these methods, it is possible to obtain a product having an in-line transmission of about 80% in a visible ray range.

By the term "in-line transmission" used herein is meant a ratio of the intensity of transmitted light incident at a certain angle to the intensity of incident light, obtained when parallel light of a certain intensity is incident on a sample of a certain thickness. In the instant specification in the embodiment described, the determination is effected on a sample of a thickness of 500 $\mu$m (mircometers) and at a wavelength of 550 nm (nanometers).

Sintered yttrium oxide bodies have broad uses as envelopes of high pressure metal vapor discharge lamps, various electronic materials, and other heat resistant and corrosion resistant materials to be used at high temperatures.

Although products obtained by the foregoing conventional methods are excellent in in-line transmission, they include various preparation difficulties. For instance, in the conventional methods (1), (2) and (3), since a press sintering technique such as hot pressing is adopted, these methods are not suitable for preparing sintered bodies having a complicated configuration, such as an envelop of a high pressure metal vapor discharge lamp. Further, the conventional method (1) should employ a tungststen spacer and conduct the post treatment for removal of residual carbon, and therefore, this method is much complicated.

Since a sintered body obtained according to the conventional method (2) is deformed in the lateral direction vertical to the pressing direction, in this conventional method it is impossible to prepare a sintered body of an optional form at a high size accuracy.

The conventional method (3) is defective in that a zirconia spacer should be employed, sintering and cooling treatments should be conducted for a long time and the press heating procedures are much complicated.

In the conventional method (4), if the molding is conducted under a molding pressure customarily adopted, namely under a pressure lower than 3 tons per square centimeter, the in-line transmission of the resulting sintered body is less than about 50% and in order to obtain a product having a high transparency, the molding pressure should be elevated beyond an ordinary range. Accordingly, the practical value of this conventional method is very low. Further, the evacuation treatment to be necessarily conducted when the above-mentioned high pressure molding is conducted necessitates provision of specific evacuation equipment in an electric furnace. Further, this method includes a fear that the sintering is inhibited by oxidation of a heat generator of a sintering furnace which is composed of a high melting point metal. Moreover, since the crystal transformation point yttrium oxide is 2270°C., when the sintering is conducted at such a high temperature as exceeding 2300°C., cracks are readily formed in the sintered yttrium oxide body.

In addition to the foregoing four methods, there is known a method for preparing a polycrystalline transparent yttrium oxide body which comprises adding several mole percent of thoria (ThO$_2$) to yttrium oxide. However, since the product is not pure yttrium oxide, it is very inferior in corrosion resistance to an alkali metal vapor.

SUMMARY OF THE INVENTION

It is a primary object of this invention to provide an improvement in the above-mentioned method (4) wherein a polycrystalline transparent sintered body of yttrium oxide having an optional and complicated configuration can be obtained very easily. Another object of this invention is to provide such improvement in which even if the molding pressure is much lowered as compared with the case of the conventional technique, a polycrystalline yttrium oxide body having a sufficient transparency can be obtained. Still another object of this invention is to provide a method for preparing a sintered yttrium oxide body having a high transparency and being free of cracks by conducting the sintering at a temperature lower than the transformation point of yttrium oxide.

More specifically, this invention relates to an improvement in a method for producing a sintered polycrystalline yttrium oxide body having a high transparency comprising the steps of preparing a press molded body from a highly pure yttrium oxide powder and sintering the press molded body, said improvement being characterized in that the step of sintering the press molded yttrium oxide body is conducted in the presence of beryllium oxide.

This invention will now be described in greater detail.

DETAILED DESCRIPTION OF THE INVENTION

This invention includes two principal embodiments.

In accordance with the first embodiment of this invention, a powder of beryllium oxide is added to a powder of yttrium oxide when the yttrium oxide powder is molded into a desired form. It is also possible to add a beryllium compound easily convertible to beryllium oxide at the sintering step instead of a powder of beryllium oxide. As such beryllium compound, there is employed at least one member selected from the group consisting of beryllium chloride, beryllium nitrate, beryllium fluoride, beryllium sulfate, beryllium acetate and beryllium carbonate.

In accordance with the second embodiment of this invention, a beryllium oxide vapor is made present in a sintering atmosphere at the step of sintering the press molded yttrium oxide body. Namely, it is not always necessary to make beryllium oxide present in the starting yttrium oxide powder at the press molding step, but is allowable to make a vapor of beryllium oxide present in a sintering atmosphere at the sintering step. This may be accomplished by various methods. For instance, solid BeO is independently disposed in a sintering atmosphere in which a press molded yttrium oxide body is placed, and when the sintering is effected, the BeO solid is heated and evaporated, whereby the BeO vapor is incorporated in the sintering atmosphere. Further, it is possible to introduce a vapor of a beryllium halide such as BeCl$_2$ together with oxygen or steam into the sintering atmosphere, and to convert it to BeO in the heated sintering atmosphere.

As described above, the method of this invention includes the first embodiment in which BeO is added in advance to yttrium oxide at the step of press molding the yttrium oxide powder, and the second embodiment in which a vapor of BeO is made present in an atmosphere at the step of sintering the press molded yttrium oxide body. In each of these two embodiments, BeO is in the state of having contact with yttrium oxide at the sintering step, and similar results can be obtained in these two embodiments.

When the method of this invention is worked on an industrial scale, the first embodiment in which BeO powder or a compound easily convertible to BeO at the sintering step is added to the starting yttrium oxide powder at the press molding step is advantageous, because the amount incorporated at BeO can be easily controlled. This industrially advantageous typical embodiment of the method of this invention is characterized by press molding a mixed powder of substantially pure yttrium oxide (99.99%) and BeO in an amount of about 0.01 to about 1.0% by weight as calculated as BeO based on the amount of yttrium oxide into a desired form, and sintering the press molded body.

As detailed below, it is preferred that the press molding is conducted under a molding pressure of about 0.3 to about 3 tons per square centimeter. As regards the sintering conditions, the primary sintering is carried out at about 2050 to about 2250°C., preferably about 2100 to about 2250°C., in an atmosphere of dry hydrogen having a dew point lower than about −5°C., practically preferably about −5 to about −70°C., for at least about 30 minutes, i.e., from about 30 to about 1000 minutes, preferably 30 to 300 minutes and then the secondary sintering is carried out at about 1800 to about 2250°C. in an atmosphere of hydrogen having a dew point of about 0 to about 25°C., for at least about 10 minutes, i.e., from about 10 to about 60 minutes, preferably 10 to 30 minutes. It is desired that the secondary sintering is carried out at a temperature substantially lower than the temperature at the primary sintering step, i.e., at least about 170°C. lower. When the yttrium oxide body is colored at the primary sintering step, complete decoloration is attained at the secondary sintering step. It is also possible to conduct the primary sintering in vacuo. In this case, the evacuation should be conducted so that the pressure is lower than $10^{-4}$ Torr. From the practical viewpoint, it is preferred that the pressure is lowered to $10^{-4}$ to $10^{-6}$ Torr. Further, in case the primary sintering is conducted in vacuo, the secondary sintering need not be carried out.

In case a beryllium compound convertible under sintering conditions to BeO is added instead of BeO, it is preferred that the powdery mixture of ytrrium oxide and such beryllium compound is subjected to a preliminary sintering treatment conducted at 700 to 1200°C. in the air for at least 30 minutes to thereby convert such compound completely to BeO. Generally, a period of 30 to 120 minutes will suffice.

Starting yttrium oxide to be used in this invention has preferably such a high purity as 99.9% or more. In case high heat resistance or high corrosion resistance to metal gas or the like is especially required, it is desired that the impurity content is lowered as much as possible, namely starting yttrium oxide has a purity of 99.9% or more. Substantially equivalent results can be obtained when yttrium compounds convertible to yttrium oxide under sintering conditions, such as yttrium carbonate and yttrium oxalate are used as the starting material as long as the high purity yttrium oxide is obtained. In this case, it is necessary to conduct the preliminary sintering treatment to convert such compound to $Y_2O_3$.

It is advantageous that BeO is added to yttrium oxide by the wet mixing method in the form of chloride, nitrate fluorate, sulfate, acetate or carbonate. It is also advantageous that powder of BeO is directly blended in yttrium oxide by the dry or wet mixing method if conducted under such conditions as will give a sufficiently homogenous mixture.

The powder molding pressure within the heretofore described limits is not particularly critical in this invention. However, when the molding pressure is lower than 0.3 ton per square centimeter, the strength of the molded body is low and there is an apprehension that the molded body may be broken during the subsequent steps. Therefore, the molding pressure is adjusted to at least 0.3 ton per square centimeter. No particular effect is attainable even when the molding pressure is elevated too highly. Further, at an excessively high molding pressure, such undesired phenomena as destroy the molded body or formation of residual pores in the sintered body are frequently caused to occur. Therefore, the upper limit of the practical molding pressure is about 3 tons per square centimeter.

A preferred instance of the preparation process is as follows:

Powder of yttrium oxide having a purity of 99.9% and a particle size of 4 $\mu$ on the average is mixed with an aqueous solution containing beryllium chloride at such a concentration as giving a desired amount of beryllium component as calculated as BeO, and the mixture is heated at about 100°C. and dried sufficiently. Then, the so formed starting material powder is molded into a desired form under a molding pressure of about 2 tons per square centimeter. The preliminary sintering treatment is conducted at 850°C. in the air for 60 minutes to thereby convert $BeCl_2$ added to $Y_2O_3$ to BeO completely. If desired, the sintered body is processed so that the size of the sintered body will be quite in agreement with the desired form. The sintering conditions vary to some extent depending on the amount of BeO added to yttrium oxide, but is generally preferred that the sintering is carried out at 2100 to 2250°C. for about 5 hours.

BeO used in this method reacts with yttrium oxide at the sintering temperature to give a liquid phase, which promotes diffusion and atomic bonding among yttrium oxide particles and facilitates diffusional removal of pores present in grain boundaries, whereby the texture of the sintered body can be made finely compact. Further, because of a high vapor pressure at high temperatures, BeO added to yttrium oxide evaporates after the liquid phase is once formed, and it is hardly left in the sintered yttrium oxide body. This invention has been achieved based on the finding that a sintered polycrystalline yttrium oxide body excellent in transparency can be obtained easily by utilizing the action of liquid phase sintering attained by addition of BeO to yttrium oxide.

DESCRIPTION OF THE PREFFERED EMBODIMENTS

EXAMPLE 1

Figure 1:
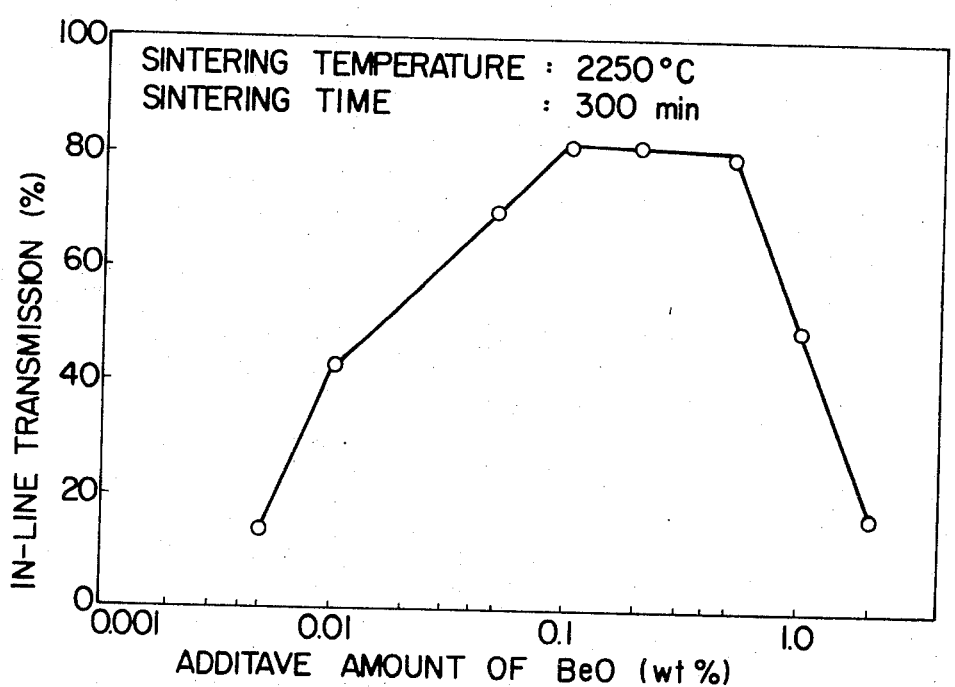
FIG. 1 is a curve showing the relation between the amount of BeO added and the in-line transmission of the resulting sintered body prepared according to the method of this invention.

FIG. 1 is a curve showing the relation between the amount added of BeO and the in-line transmission measured at a sample thickness of 500 $\mu$m and a wavelength of 550 nm (medium wavelength in the visible ray region) in the sintered yttrium oxide body of a high density prepared according to the method of this invention. The sintered body is prepared by press molding a powder of $Y_2O_3$ having a purity of 99.99% (incorporated with a desired amount of BeO) under a molding pressure of 3 tons per square centimeter, sintering the press molded body at 2250°C. for 300 minutes in an atmosphere of pure hydrogen (the dew point being −35°C.) (primary sintering) and then heating the so sintered body at 1800°C. for 10 minutes in hydrogen having a dew point of 0°C. (secondary sintering). From the results shown in FIG. 1, it is seen that BeO is very effective when it is incorporated in an amount not exceeding about 1% by weight. When the amount incorporated of BeO is about 0.05 to about 0.5% by weight, a highest in-line transmission of 70 to 81% can be obtained, and in this case, the density of the sintered body is more than 99.2% of the theoretical value.

As is seen from the results shown in the curve of FIG. 1, the in-line transmission of 43 to 81% can be obtained when the amount incorporated of BeO is within a range of from 0.01 to 1.0% by weight.

In contrast, when the amount incorporated of BeO is less than 0.005% by weight or larger than 2.0% by weight, it has been found that the in-line transmission is lower than 20%. Such effect attained by addition of BeO is owing to the fact that reaction is caused to occur between $Y_2O_3$ and BeO at a temperature approximating the sintering temperature to form a small quantity of a liquid phase in the sintered yttrium oxide body, which promotes the sintering prominently and facilitates diffusion of pores in the sintered body, and that BeO evaporates at the sintering temperature and it does not remain in the $Y_2O_3$ sintered body at the final stage.

EXAMPLE 2

Figure 2:
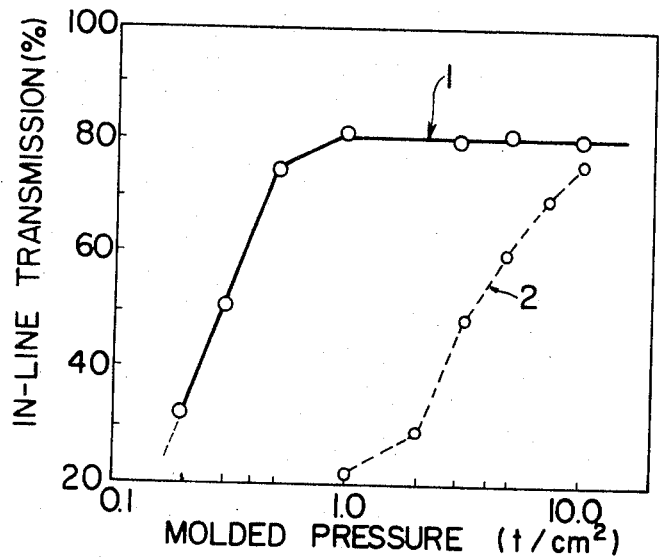
FIG. 2 is a curve showing the relation between the molding pressure and the in-line transmission of the resulting sintered body prepared according to the method of this invention.

Curve 1 of FIG. 2 illustrates the relation between the molding pressure and the in-line transmission of the sintered body obtained when 0.1% by weight of BeO is added to $Y_2O_3$. The sintering is conducted under the same conditions as described in Example 1. As is seen from this curve, an in-line transmission exceeding 50% is obtained when the molding is conducted under a molding pressure of 0.3 ton per square centimeter or higher. The in-line transmission reaches its maximum under a molding pressure higher than 1.0 ton per square centimeter and in this case, the density of the sintered body is more than 99.5% of the theoretical value.

The results shown in FIG. 2 teach that any higher molding pressure can be adopted if it exceeds 1.0 ton per square centimeter, but, when in the actual molding operation the molding pressure is maintained at a level higher than 5 tons per square centimeter, it has been found that such undesired phenomena as destruction or breakage of the molded body and damage or life shortening in the molding die are brought about. Especially when the starting powder is press molded into a cylindrical form, it is generally preferred that the press molding is conducted under a molding pressure not exceeding 3 tons per square centimeter.

According to the conventional method where sintering is conducted in the absence of BeO, a fatal defect that in order to obtain an in-line transmission higher than 50% the molding should be conducted under a molding pressure exceeding 3 tons per square centimeter cannot be obviated. In short, the results shown in curve 1 of FIG. 2 illustrate that in the method of this invention a molding pressure corresponding to about 1/10 of the molding pressure adopted in the conventional method (0.3 ton/3 tons = 1/10) is sufficient to obtain a sintered polycrystalline yttrium oxide body having an in-line transmission of 50%.

Curve 2 of FIG. 2 illustrates results of a comparative experiment where no BeO is added.

EXAMPLE 3

Figure 3:
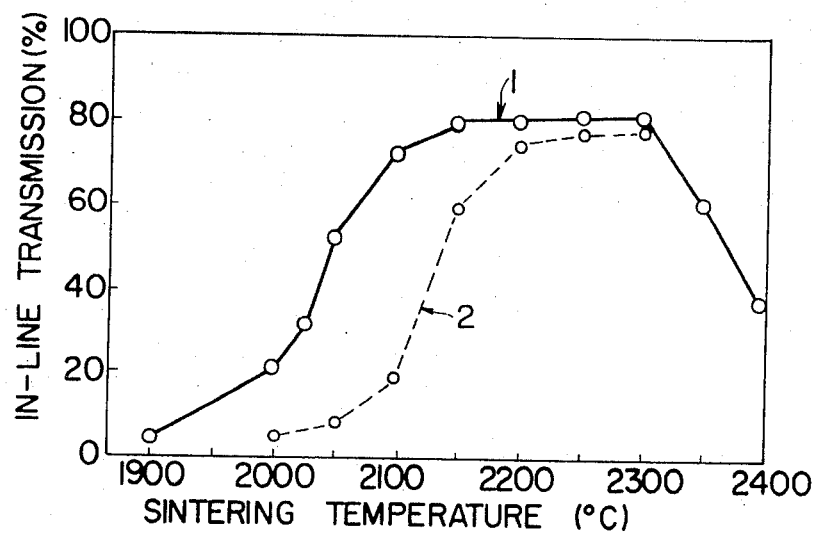
FIG. 3 is a curve showing the relation between the sintering temperature and the in-line transmission of the resulting sintered body prepared according to the method of this invention.

Curve 1 of FIG. 3 illustrates the relation between the primary sintering temperature and the in-line transmission of the sintered yttrium oxide body obtained when a powder of yttrium oxide incorporated with 0.1% by weight of BeO is press molded under a molding pressure of 2 tons per square centimeter and the primary sintering is conducted at various temperatures. The atmosphere conditions at the primary sintering and the secondary sintering conditions are the same as described in Example 1.

From the results shown in curve 1 of FIG. 3, it is seen that when the sintering temperature is within a range of from about 2050 to about 2350°C., an in-line transmission higher than 50% can be obtained and that an optimum sintering temperature is within a range of about 2100 to about 2250°C. At 2270°C. yttrium oxide change the crystal form from the cubic system to the hexagonal system. When this transformation point is passed at the sintering step, as is well known in the art, cracks are formed in the resulting sintered body. According to the method of this invention, a sintered body having a high transparency can be obtained even through the sintering is conducted at a temperature lower than the transformation point causing formation of cracks. The BeO content is less than 0.0005% in the resulting sintered yttrium oxide body, and this content is substantially equal to the BeO content in the starting yttrium oxide powder. From such fact it will readily be understood that BeO added to the starting yttrium oxide powder exhibits high effects for increasing the density and transparency in the resulting sintered body, but after the sintering, it evaporates, giving no harm to the resulting sintered body.

As is seen from curve 2 of FIG. 3 showing results of a comparative experiment where no BeO is added, according to the conventional method the in-line transmission is as low as about 20% at a sintering temperature of 2100°C. or about 10% at a sintering temperature of 2050°C.

EXAMPLE 4

Figure 4:
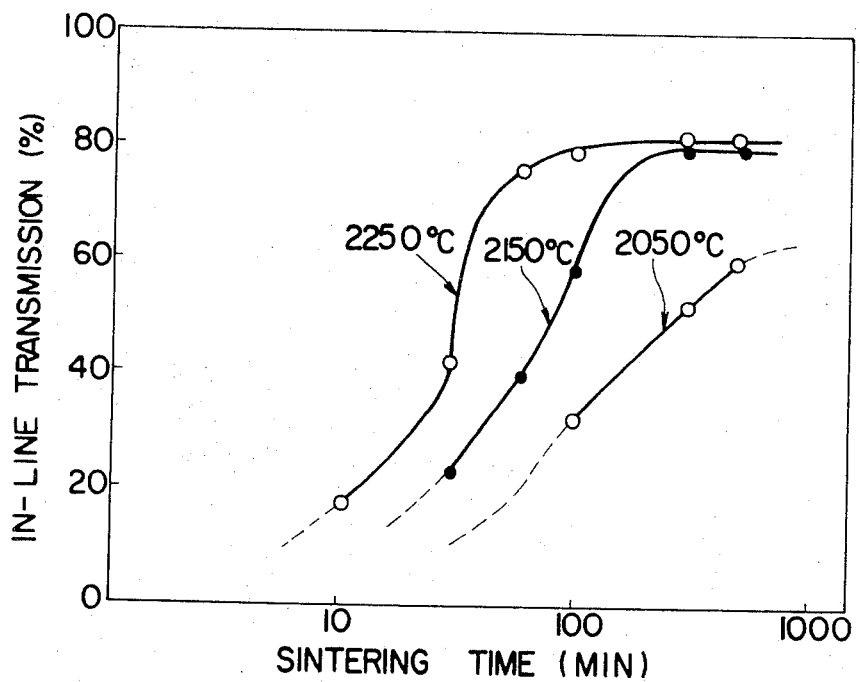
FIG. 4 is a curve showing the relation between the sintering time and temperature and the in-line transmission of the resulting sintered body prepared according to the method of this invention.

FIG. 4 is a curve illustrating the relation between the sintering temperature and time and the in-line transmission of the sintered yttrium oxide body prepared from a molded body obtained by press molding a powder of yttrium oxide incorporated with 0.1% by weight of BeO under a molding pressure of 3 tons per square centimeter. When the sintering is conducted at 2250°C., the treatment time of 30 minutes gives an in-line transmission exceeding 40% and the treatment time of 60 minutes gives a sintered body density more than 99.5% of the theoretical value and an in-line transmission of 75%. When the sintering is conducted at 2150°C., the treatment time of 60 minutes gives an in-line transmission of about 40% and the treatment time of 300 minutes gives an in-line transmission as high as 80%. Further, when the sintering temperature is 2050°C., the treatment time of 100 minutes gives an in-line transmission of about 30% and the treatment time of 500 minutes gives an in-line transmission of 60%.

EXAMPLES 5 to 10

$BeCl_2$, $BeF_2$, $Be(NO_3)_2$, $BeSO_4$, $Be(CH_3CO_2)_2$ and

BeCO₃ are chosen as the BeO-giving starting material. An aqueous solution of such beryllium compound is mixed with a powder of yttrium oxide having a high purity (99.9%), and the mixture is dried sufficiently at 100°C. The amount of beryllium compound added is so adjusted that the BeO content in the so formed powder is 0.1% by weight.

The so obtained, beryllium compound-containing yttrium oxide powder is molded into a sheet of a thickness of 3 mm under application of a molding pressure of 2 tons per square centimeter. The so molded body is heated at 850°C. for 60 minutes to convert the beryllium compound contained in the molded yttrium oxide body to BeO completely. The so treated molded body is sintered under the heat treatment conditions as described in Example 1. In the case of each of the above beryllium compounds, the resulting sintered yttrium oxide body has a high transparency, and results obtained by measuring the in-line transmission are shown in Table 1 given below:

Table 1

| Example No. | Beryllium Compound Added (0.1% by weight as BeO) | In-line Transmission (%) |
|---|---|---|
| 5 | beryllium chloride | 80 |
| 6 | beryllium fluoride | 75 |
| 7 | beryllium nitrate | 81 |
| 8 | beryllium sulfate | 73 |
| 9 | beryllium acetate | 80 |
| 10 | beryllium carbonate | 77 |

Procedures of Examples 5 to 10 are repeated in the same manner except that vacuum of $10^{-5}$ Torr is employed instead of the hydrogen atmosphere at the primary sintering treatment and the secondary sintering treatment is omitted. Data of the in-line transmission of the resulting sintered bodies are quite similar to those shown in Table 1.

EXAMPLE 11

Figure 6:
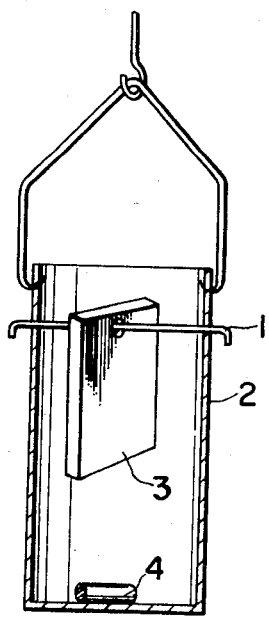
FIG. 6 is a diagram illustrating the step of sintering the press molded yttrium oxide body according to one embodiment of the method of this invention.

As is illustrated in FIG. 6, a basket 2 composed of tungsten which is charged with a molded yttrium oxide body 3 press molded under a molding pressure of 2 tons per square centimeter is set in a uniform temperature zone of a vertical electric furnace (not shown). A sintered solid BeO body 4 (sintered at 1800°C. for 1 hour) is disposed at a point about 10 mm spaced downwardly from the molded yttrium oxide body 3. The sintered solid BeO body has a diameter of about 2 mm and a length of 5 mm. Referential numeral 1 in FIG. 6 indicates a hanging rod composed of tungsten.

Hydrogen gas is introduced at a flow rate of 5 l/min. into the electric furnace from the bottom thereof. The furnace is heated 2150°C. and this temperature is maintained at 90 minutes. Then, the temperature is lowered to 1800°C. and the atmosphere is replaced by hydrogen having a dew point of 20°C. The electric furnace is maintained in this state for 20 minutes. The resulting sintered yttrium oxide body has an in-line transmission of 58% and a density corresponding to 99.5% of the theoretical value. For comparison, yttrium oxide alone is molded under the same conditions as mentioned above, the molded body is set in the electric furnace and the sintering is carried out under the same conditions as mentioned above except that no sintered solid BeO body is made present in the electric furnace. The resulting sintered yttrium oxide body has such a low in-line transmission as 12%.

The solid BeO disposed in the electric furnace in this Example evaporates at the sintering temperature, and a part of the vapor reacts with the sample of yttrium oxide to form a small quantity of a liquid phase, which promotes sintering of yttrium oxide. Then, BeO evaporates again and it is hardly left in the resulting sintered yttrium oxide body. The BeO content in the sintered yttrium oxide body is 0.0005%.

As is seen from the foregoing explanation, even when BeO is added at the sintering step, there can be obtained an effect similar to that obtained when BeO is added to the starting yttrium oxide powder.

EXAMPLE 12

A molded yttrium oxide body press molded under a molding pressure of 1.5 tons per square centimeter is set in a vertical electric furnace, and the furnace is heated while introducing pure hydrogen at a flow rate of 5 l/min. into the furnace from a gas introduction opening thereof. The furnace is maintained at 1800°C. for 10 minutes, and then the atmosphere is replaced by hydrogen gas containing 0.2% of BeCl₂. The furnace temperature is elevated to 2150°C. and the furnace is maintained at this temperature for 120 minutes. Then the temperature is lowered to 1800°C. and the atmosphere is replaced by hydrogen having a dew point of 0°C. The furnace is maintained in this state for 30 minutes. The in-line transmission of the resulting sintered oxide body was 60%. In case the sintering is conducted under the same conditions by employing hydrogen not containing BeCl₂, the in-line transmission of the resulting sintered body is as low as that of the comparative sintered body obtained in Example 11.

In this Example, BeCl₂ contained in hydrogen reacts with hydrogen at the sintering temperature, giving Be and HCl. Be then reacts with Y₂O₃ to form a liquid phase, which promotes improvement of the transparency of Y₂O₃ according to the principle explained in Example 11.

In case vapor of a beryllium compound is introduced into the sintering atmosphere as in this Example, in addition BeCl₂, such compounds as beryllium halides, e.g., beryllium bromide (BeBr₂), beryllium fluoride (BeF₂) and beryllium iodide (BeI₂), and beryllium nitrate (Be(NO₃)₂) can be used and similar effects can be obtained by employing these compounds.

In each of the foregoing Examples, only one beryllium compound is employed. However, this invention is not limited to such embodiment along, and similar effects can be obtained without any disadvantage when a plurality of beryllium compounds are employed coincidentally within the required weight limits.

EXAMPLE 13

Figure 5:
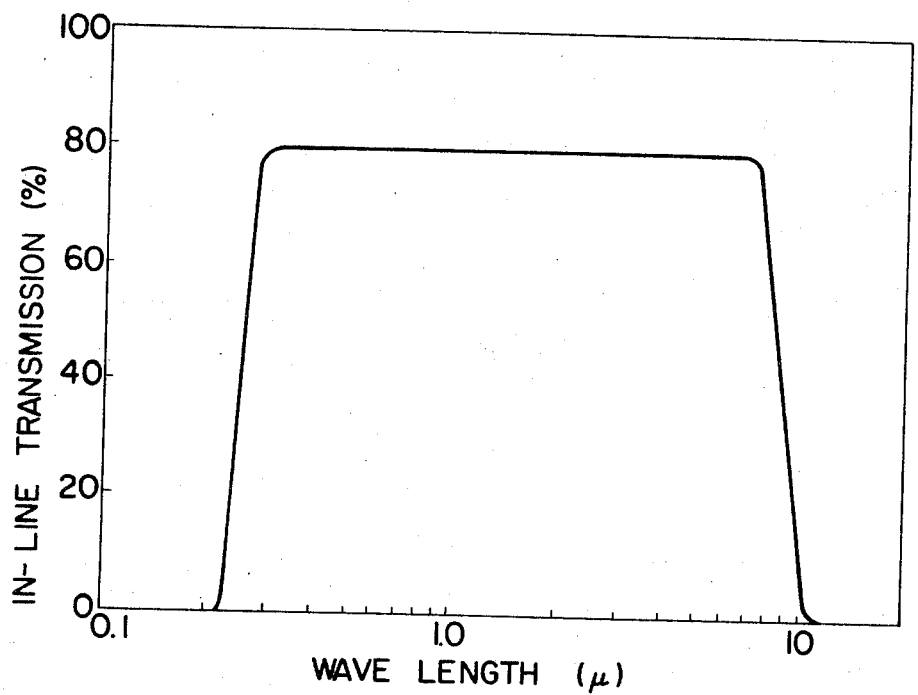
FIG. 5 is a curve showing the relation between the wavelength and the in-line transmission of the resulting sintered body prepared according to the method of this invention.

FIG. 5 is a curve illustrating the relation between the in-line transmission and the wavelength in the sintered transparent yttrium oxide body of this invention. As is seen from this curve, the ultraviolet adsorption end is at a wavelength of 0.222 μ and the infrared absorption end is at a wavelength of 11 μ. Thus, it is evident that the sintered yttrium oxide body of this invention exhibits a very high transmission within a broad range of from the visible region to the infrared region.

As is seen from the foregoing explanation, according to this invention, a sintered yttrium oxide body of a complicated configuration having a high transparency and a high density can be prepared much more easily than in the conventional method, and a sintered body free of cracks can be obtained at a lower temperature with a better reproducibility than in the conventional method.

The sintered polycrystalline yttrium oxide body obtained according to the method of this invention can be used effectively as various heat-resistant and oxidation-resistant materials, electronic materials and envelopes of high pressure metal vapor discharge lamps. Thus, this invention makes great contributions to the art.

While the novel principles of the invention have been described, it will be understood that various omissions, modifications and changes in these principles may be made by one skilled in the art without departing from the spirit and scope of the invention.

What is claimed is:

1. In the method for producing a transparent highly pure sintered polycrystalline body consisting of yttrium oxide having a high in-line transmission for a wide range spectrum from visible-to-far infrared rays, comprising the steps of preparing a press molded body from highly pure yttrium oxide powder and sintering the press molded body in an atmosphere selected from the group consisting of hydrogen and vacuum, the improvement wherein the step of sintering the press molded body is conducted in the presence of beryllium oxide.

2. A method for producing a transparent highly pure sintered polycrystalline body consisting essentially of yttrium oxide having a high in-line transmission for a wide range spectrum from visible to far infrared rays, comprising the steps of (1) press molding a mixture of highly pure yttrium oxide having a purity of at least 99.9% and 0.01 to 1.0% by weight, based on yttrium oxide and measured as beryllium oxide, of beryllium oxide and/or a beryllium compound easily convertible under sintering conditions to beryllium oxide under a molding pressure of at least 0.3 ton per square centimeter to form a molded boy of a desired shape, and (2) subjecting said molded body to a sintering treatment comprising (a) heating the molded body in a dry hydrogen atmosphere having a dew point of about $-5°C$. or lower at a temperature 2050° to 2250°C. for at least about 30 minutes to thereby sinter the molded body and (b) refiring the resultant sintered body in a hydrogen atmosphere having a dew point of at least 0° C. and maintained at 1800° to 2250°C. for at least about 10 minutes to thereby effect decoloration of the sintered body, whereby a highly pure transparent polycrystalline sintered body of yttrium oxide having a high in-line transmission is obtained.

3. The method according to claim 2, wherein the heating step (a) is conducted at a temperature of 2100° to 2250°C.

4. The method according to claim 2, wherein the beryllium compound is selected from the group consisting of beryllium chloride, beryllium nitrate, beryllium fluoride, beryllium sulfate, beryllium acetate and beryllium carbonate, said beryllium compound is employed instead of beryllium oxide, and the press molded body is pre-fired in air at 700° to 1200°C. for at least about 30 minutes to convert the beryllium compound to beryllium oxide prior to the sintering step (2).

5. The method according to claim 2, wherein the press molded body contains 0.05 to 0.5% by weight of beryllium oxide and the resultant sintered body has an in-line transmission of 70 to 81%.

6. A method for producing a transparent highly pure sintered polycrystalline body consisting essentially of yttrium oxide having a high in-line transmission for a wide range spectrum from visible to far infrared rays, comprising the steps of (1) press molding highly pure yttrium oxide having a purity of at least 99.9% under a molding pressure of at least 0.3 ton per square centimeter to form a molded body of a desired shape, and (2) subjecting the molded body to a sintering treatment comprising (a) heating the molded body in a dry hydrogen atmosphere having a dew point of about $-5°C$. or lower and containing a vapor beryllium oxide, beryllium halides and beryllium nitrate at a temperature of 2050° to 2250°C. for at least about 30 minutes to sinter the molded body and (b) re-firing the resultant sintered body in a hydrogen atmosphere having a dew point of at least 0°C. maintained at 1800° to 2250°C. for at least about 10 minutes to effect decoloration of the sintered body, whereby a highly pure transparent polycrystalline sintered body of yttrium oxide having a high in-line transmission can be obtained.

7. The method according to claim 6, wherein the heating step (a) is conducted at a temperature of 2,100° to 2,250°C.

8. A method for producidng a transparent highly pure sintered polycrystalline body consisting essentially of yttrium oxide having a high in-line transmission for a wide range spectrum from visible to far infrared rays, comprising the steps of (1) press molding a mixture of 99.0 to 99.99% by weight of highly pure yttrium oxide having a purity of at least 99.9% and 0.01 to 1.0% by weight, based on yttrium oxide and measured as beryllium oxide, of beryllium oxide and/or a beryllium compound easily convertible under sintering conditions to beryllium oxide under a molding pressure of at least 0.3 ton per square centimeter to form a molded body of a desired shape, and (2) sintering the molded body at a temperature of 2050° to 2250°C. for at least 30 minutes in a vacuum atmosphere in which the pressure is not higher than $10^{-4}$ Torr, whereby a highly pure transparent polycrystalline sintered body of yttrium oxide having a high in-line transmission can be obtained.

9. The method according to claim 2, wherein said molding pressure is between about 0.3 and 3 tons per square centimeter.

10. The method according to claim 2, wherein the dry hydrogen atmosphere in step (a) has a dew point of about $-5°$ to $-70°C$.

11. The method according to claim 10, wherein the hydrogen atmosphere in step (b) has a dew point of about 0° to about 25°C., said re-firing being accomplished at a temperature of at least about 170°C. below the temperature in step (a).

12. The method according to claim 2, wherein step (a) is accomplished for about 30 to 300 minutes and step (b) is accomplished for about 10 to 30 minutes.

13. The method according to claim 8, wherein said molding pressure is between about 0.3 to 3 tons per square centimeter.

14. The method according to claim 8, wherein the press molded mixture of highly pure yttrium oxide is sintered at a pressure of about $10^{-4}$ Torr to $10^{-6}$ Torr.

15. The method according to claim 1, wherein the amount of beryllium oxide present is about 0.01 to 1.0% based on the weight of the yttrium oxide.

16. A method for producing a transparent highly pure sintered polycrystalline body consisting essentially of yttrium oxide having a high in-line transmission for a wide range spectrum from visible to far infrared rays, comprising the steps of (1) preparing a press molded body from highly pure yttrium oxide having a purity of at least 99.9% or a ytrrium compound convertible to yttrium oxide having a purity of at least 99.9% under sintering conditions, and (2) sintering a press molded body in an atmosphere consisting of hydrogen or a vacuum in the presence of beryllium oxide.

17. The method according to claim 16, wherein said press molded body is prepared by press molding a compound convertible to yttrium oxide under sintering conditions and thereafter subjecting the articles so formed to a preliminary sintering treatment conducted to 700° to 1200°C. in an oxidizing atmosphere for a time sufficient to convert said yttrium compound to yttrium oxide.

18. The method according to claim 17, wherein said yttrium compound convertible to yttrium oxide is selected from the group consisting of yttrium carbonate and yttrium oxalate.

19. The method according to claim 18, wherein 0.01 to 0.1% by weight of beryllium oxide or a compound convertible to beryllium oxide under sintering conditions are admixed with the yttrium compound convertible to yttrium oxide prior to press molding, the percents being based on the weight of said yttrium compound measured as yttrium oxide and the weight of said beryllium oxide and/or beryllium compound convertible to beryllium oxide measured as beryllium oxide.

20. The method according to claim 19, wherein said press molded body is prepared under a molding pressure of at least about 0.3 ton per square centimeter, and further wherein sintering is accomplished by (a) heating the molded body in a dry hydrogen atmosphere having a dew point of about −5°C. or lower at a temperature of 2050° to 2250°C. for at least 30 minutes to thereby sinter the molded body and (b) re-firing the resultant sintered body in a hydrogen atmosphere having a dew point of at least 0°C. and maintained at 1800° to 2250°C. for at least about 10 minutes to thereby effect decoloration of the sintered body.

21. The method according to claim 19, wherein said compound convertible to beryllium oxide is selected from the group consisting of beryllium chloride, beryllium nitrate, beryllium fluoride, beryllium sulfate, beryllium acetate and beryllium carbonate.

22. The method according to claim 19, wherein said press molded body is formed under a molding pressure of at least about 0.3 ton per square centimeter, said sintering being accomplished by heating the molded body at a temperature of about 2,050° to 2,250°C. for at least about 30 minutes in vacuo at a pressure not higher than about $10^{-4}$ Torr.

23. The method according to claim 17, wherein said press molded body consists of yttrium oxide having a purity of at least 99.9%, said press molded body being sintered in an atmosphere containing a vapor beryllium compound selected from the group consisting of beryllium oxide, beryllium halides and beryllium nitrate.

24. The method according to claim 23, wherein the sintering treatment comprises (a) heating the press molded body in a dry hydrogen atmosphere having a dew point of about −5°C. or lower and containing a vapor of a beryllium compound selected from the group consisting of beryllium oxide, beryllium halides and beryllium nitrate at a temperature of 2,050° to 2,250°C. for at least about 30 minutes to sinter the molded body and (b) re-firing the resultant sintered body in a hydrogen atmosphere having a dew point of at least 0°C. and maintained at 1,800° to 2,250°C. for at least about 10 minutes to effect decoloration of the sintered body.

* * * * *